(12) United States Patent
Ottemann et al.

(10) Patent No.: US 7,900,569 B2
(45) Date of Patent: Mar. 8, 2011

(54) PEDESTAL FOR A SAILING BOAT

(75) Inventors: William C. Ottemann, Fallbrook, CA (US); Mark G. Wiss, Middletown, CA (US); Michele Cazzaro, Besozzo (IT)

(73) Assignee: Harken Italy, S.p.A., Lurago Marinone (Como) (IT)

( * ) Notice: Subject to any disclaimer, the term of this patent is extended or adjusted under 35 U.S.C. 154(b) by 0 days.

(21) Appl. No.: 12/257,535

(22) Filed: Oct. 24, 2008

(65) Prior Publication Data

US 2009/0114134 A1   May 7, 2009

(30) Foreign Application Priority Data

Nov. 7, 2007 (EP) ..................................... 07425701

(51) Int. Cl.
*B63H 9/04* (2006.01)
(52) U.S. Cl. .................... 114/102.17; 254/299
(58) Field of Classification Search ............... 114/102.1, 114/102.17, 102.2, 102.21, 343, 364, 105; 254/299, 303, 315, 317, 334, 344, 348, 349, 254/359, 367; 474/62, 68
See application file for complete search history.

(56) References Cited

U.S. PATENT DOCUMENTS

| | | | | |
|---|---|---|---|---|
| 3,145,974 A | * | 8/1964 | Short | 254/344 |
| 3,670,589 A | * | 6/1972 | Carter | 254/344 |
| 4,667,934 A | * | 5/1987 | Ottemann | 254/344 |
| 4,823,630 A | * | 4/1989 | Huggett | 254/299 |
| 5,398,637 A | * | 3/1995 | Chambers | 114/343 |
| 7,422,196 B2 | * | 9/2008 | Binetti Pozzi et al. | 254/349 |
| 2002/0098930 A1 | * | 7/2002 | Merello et al. | 474/62 |
| 2005/0176535 A1 | | 8/2005 | Matsumoto | |

FOREIGN PATENT DOCUMENTS

| | | |
|---|---|---|
| EP | 0182547 A | 5/1986 |
| EP | 1607323 A | 12/2005 |
| GB | 977370 A | 12/1964 |
| WO | 96/11841 A | 4/1996 |

OTHER PUBLICATIONS

European Search Report for parent application EP 07 42 5701, mailed Apr. 29, 2008.

* cited by examiner

*Primary Examiner* — Lars A Olson

(74) *Attorney, Agent, or Firm* — Alan R. Stewart; Godfrey & Kahn, S.C.

(57) ABSTRACT

A pedestal (1) for a sailing boat comprises a casing (2) and inside such a casing (2): at least one driving wheel (11a, 11b) associated with a motion input shaft (3), at least one driven wheel (12a, 12b) associated with a motion output shaft (4) and at least one motion transmission element (13a, 13b) from said at least one driving wheel (11a, 11b) to said at least one driven wheel (12a, 12b). The pedestal (1) further comprises, also inside the casing (2), a speed variation system selectively activatable to vary the rotation speed of the motion output shaft (4) with respect to that of the motion input shaft (3).

20 Claims, 4 Drawing Sheets ial No. 07425701.5, filed on Nov. 7, 2007, the
PEDESTAL FOR A SAILING BOAT

CROSS-REFERENCE TO RELATED APPLICATION

The present application claims priority to European Application Serial No. 07425701.5, filed on Nov. 7, 2007, the disclosure of which is incorporated herein by reference.

DESCRIPTION

The present invention refers to a pedestal for a sailing boat.

It is known to use pedestals to actuate one or more winches on sailing boats, in particular medium-large racing boats. Such pedestals are positioned on the deck of the boat in a remote position with respect to the winches and kinematically connected to them through suitable motion transmission elements. Thanks to such a drive system it is possible for one or more members of the crew to actuate remotely and in a centralised manner one or more winches. Moreover, pedestals allow operation in upright position, which is more comfortable and allows greater power to be provided.

Known pedestals typically consist of a casing that encloses a belt or chain transmission between a driving wheel associated with a motion input shaft arranged at a top end of the pedestal, and a driven wheel associated with a motion output shaft arranged at a bottom end of the pedestal. The rotation of the motion input shaft, and therefore of the driving wheel, is caused by the members of the crew through suitable handles mounted at the ends of the motion input shaft, outside the pedestal. The motion output shaft is kinematically connected to one or more motion transmission shafts arranged under the deck, which are in turn kinematically connected to the main shafts of respective winches through bevel gears at 90°.

On modern sailing boats, especially on racing boats, it is often necessary to perform manoeuvres requiring very fast actuation of the sheets and, consequently, high rotation speeds of the winches that actuate such sheets.

In order to achieve this result it is known to use speed gears to vary, and in particular increase, the rotation speed of the main shaft of the winch(es) driven by the pedestal while maintaining the same rotation speed of the motion input shaft of the pedestal. Such speed gears normally consist of gearboxes positioned under the deck and downstream of the pedestal motion output shaft, at each motion transmission branch to a winch, and they are driven through pedal push buttons.

A constant requirement in the design of sailing boats, in particular racing boats, is to reduce the weight and bulk of the components mounted onboard.

In light of this requirement, the solution described above of using gearboxes in the motion transmission branches downstream of the motion output shaft of the pedestal is not optimal, since it requires to use a gearbox for each winch driven by a pedestal, with an inevitable multiplication of weight and bulk onboard.

The Applicant has found that such drawbacks can be overcome through a suitable design of the kinematic chain between the motion input shaft of the pedestal and the winches driven by it, particularly of the part thereof between the motion input shaft and the motion output shaft of the pedestal.

The technical problem underlying the present invention is to provide a pedestal for a sailing boat that allows a variable speed motion transmission between the motion input shaft of the pedestal and the winch(es) driven by it to be obtained, and, at the same time, the weight and bulk of the components mounted onboard the boat for said motion transmission to be reduced as much as possible.

The invention therefore refers to a pedestal for a sailing boat according to claim 1. Preferred features of such a pedestal are indicated in the dependent claims.

In particular, the invention concerns a pedestal for a sailing boat comprising a casing and, inside said casing:

- at least one driving wheel associated with a motion input shaft;
- at least one driven wheel associated with a motion output shaft, and
- at least one motion transmission element from said at least one driving wheel to said at least one driven wheel, characterised in that it comprises, inside said casing, a speed variation system selectively activatable to vary the rotation speed of said motion output shaft with respect to that of said motion input shaft.

The pedestal of the invention allows two advantages to be obtained simultaneously.

Firstly, since the speed variation system acts upstream of the motion output shaft of the pedestal it is possible to use a single speed variation system independently of the number of winches driven by the pedestal. Therefore, the use of the pedestal of the invention advantageously allows a weight and cost reduction as far as components, particularly gearboxes, mounted onboard the boat are concerned compared to the solutions described above with the pedestals of the prior art, which require the use of a gearbox in each output motion transmission branch departing from the pedestal.

Secondly, the integration of the speed variation system inside the pedestal advantageously allows a reduction in the bulk and interventions under the deck with respect to those instead necessary when it is desired to provide a motion transmission with speed variation using the pedestals of the prior art. This advantage arises even in the case of pedestals actuating just one winch.

According to a preferred embodiment of the invention the speed variation system comprises a gearbox operatively interposed between a first motion transmission element acting between the at least one driving wheel and the gearbox and a second motion transmission element acting between the gearbox and the at least one driven wheel.

According to another preferred embodiment of the invention, the pedestal comprises at least two driving wheels having different diameters associated with the motion input shaft and a driven wheel associated with the motion output shaft, and the speed variation system comprises actuating means activatable to allow the engagement of the at least one motion transmission element selectively with a wheel of said at least two driving wheels.

This solution is advantageously applicable with minimal design modifications to standard pedestals, which typically use a belt or chain transmission between the motion input shaft and the motion output shaft in the column. Moreover, it can be carried out with a reduced number of components, to the benefit of weight reduction onboard the boat.

Preferably, the driven wheel has a diameter equal to the smaller of the diameters of the at least two driving wheels.

Having defined the pedestal gear ratio as the ratio between the rotation speed of the motion output shaft and the rotation speed of the motion input shaft, thanks to this feature it is advantageously possible to obtain a pedestal gear ratio equal to 1 when the motion transmission is active between the wheels with equal diameter, and a pedestal gear ratio greater than 1 when the motion transmission is active between the wheels with different diameters. In this last case it is possible to actuate the winch(es) connected to the pedestal at higher speeds maintaining a same rotation speed of the motion input shaft.

In an alternative preferred embodiment, symmetrical with respect to the previous one, the pedestal comprises a driving wheel associated with the motion input shaft and at least two driven wheels having different diameters associated with the motion output shaft, and the speed variation system comprises actuating means activatable to allow the engagement of the at least one motion transmission element selectively with a wheel of the at least two driven wheels.

Preferably, again in order to provide one pedestal gear ratio equal to 1 and another greater than 1, the driving wheel has a diameter equal to the greater of the diameters of the at least two driven wheels.

Preferably, the actuating means used in the embodiments described above comprise a derailleur.

According to a further preferred embodiment of the invention the pedestal comprises a first driving wheel associated with the motion input shaft and a first driven wheel associated with the motion output shaft operatively connected with each other through a first motion transmission element to form a first motion transmission group, and a second driving wheel associated with the motion input shaft and a second driven wheel associated with the motion output shaft operatively connected with each other through a second motion transmission element to form a second motion transmission group, at least one from said first and second driving wheel and said first and second driven wheel having a diameter different from that of the other wheels, and the speed variation system comprises actuating means actuatable to selectively activate the motion transmission in one group of said first and second motion transmission group.

Advantageously, in this embodiment it is possible to use actuating means of the speed variation system that are actuatable whatever the direction of rotation of the components on which they act, without the need for specific and complex constructive adjustments, as on the other hand would be necessary in embodiments in which the actuating means comprise for example a derailleur. In this embodiment it can be therefore easily ensured that the speed variation system works whatever the direction of rotation of the motion input shaft, which depends on the command that has to be given through the pedestal.

Preferably, the first and the second driving wheel have a same diameter and the first and the second driven wheel have different diameters, and the diameter of the larger driven wheel is equal to the diameter of said first and second driving wheel.

Alternatively, it is also possible for the first and the second driving wheel to have different diameters and for the first and second driven wheel to have a same diameter, and for the diameter of the smaller driving wheel to be equal to the diameter of said first and second driven wheel.

Advantageously, in both of the embodiments the relationship between diameters of the driving wheels and diameters of the driven wheels is such that with one of the two transmission groups of the pedestal a pedestal gear ratio equal to 1 is obtained, and with the other transmission group a pedestal gear ratio greater than 1 is obtained.

Preferably, in this embodiment with two motion transmission groups the actuating means are associated in a first operating configuration with said first driving wheel and in a second operating configuration with said second driving wheel.

In this case the actuating means can easily be set up for actuation by hand at the motion input shaft, with a completely mechanical, direct drive.

Alternatively, the actuating means can be associated in a first operating configuration with said first driven wheel and in a second operating configuration with said second driven wheel.

In this case the actuating means can be driven by a pedal push button arranged on the deck near to the base of the pedestal, in a known way.

Preferably, the first and second driving wheel or the first and second driven wheel are respectively mounted on the motion input shaft or on the motion output shaft free to rotate and the actuating means comprise at least one clutch and drive means of said at least one clutch actuatable to make one from said first and second driving wheel or from said first and second driven wheel selectively rotatably integral with the respective shaft.

Preferably, the at least one clutch comprises a first and a second flange respectively associated with the first and second driving wheel or with the first and second driven wheel, said first and second flange being provided with respective toothings facing towards said motion input shaft or said motion output shaft, and an annular element associated with the motion input shaft or with the motion output shaft, said annular element being provided with at least one tooth extending radially suitable for engaging selectively with the toothing of said first flange or of said second flange upon actuation of the drive means.

Preferably, the motion input shaft or the motion output shaft is hollow and is provided, at a lateral surface thereof, with at least one longitudinal opening of predetermined length, the drive means comprise a drive shaft slidably mounted in said motion input shaft or said motion output shaft, and said annular element is associated with the drive shaft so that the at least one tooth projects radially through said at least one opening and, upon actuation of the drive shaft, translates along such an opening between a first operating position, in which it is engaged with the toothing of the first flange, and a second operating position, in which it is engaged with the toothing of the second flange.

These features advantageously allow a particularly simple and reliable operation of the actuating means and of the associated drive means to be obtained, as well as a minimisation of their bulk inside the pedestal, thanks to the partial integration with the motion input shaft or the motion output shaft.

Preferably, the annular element is slidably mounted on the drive shaft and the drive means comprise at least two elastic elements respectively acting between axially opposite abutment portions defined in the drive shaft and corresponding opposite sides of the annular element.

Advantageously, thanks to the partial decoupling between the axial movement of the annular element having the at least one tooth and that of the drive shaft, this construction makes the actuation of the drive shaft independent from the particular relative angular position between motion input shaft (and therefore drive shaft) and first or second flange, so that the drive shaft can in any case be actuated up to the end of its stroke, without the need for a prolonged action on it. If indeed, upon actuation of the drive shaft, the engagement of the at least one tooth with a respective seat of the toothing in the first or in the second flange cannot take place, the movement of the drive shaft takes the annular element into abutment against the face of one of said flanges and, going further up to the end of its stroke, determines the compression of one of said at least two elastic means. When, further to a rotation of the motion input shaft, a relative angular position is reached that allows engagement, the elastic force thrusts the annular element determining the engagement automatically.

In a preferred embodiment of the invention the at least one motion transmission element is a belt and the at least one driving wheel and the at least one driven wheel are pulleys.

In an alternative preferred embodiment of the invention the at least one motion transmission element is a chain and the at least one driving wheel and the at least one driven wheel are toothed wheels.

In the embodiment with chain transmission, the pedestal preferably comprises a tensioning device for the chain.

Preferably, the tensioning device comprises a substantially V-shaped spring element having two free end portions acting on opposite branches of the chain.

More preferably, said spring element is snap fitted to said motion output shaft.

Advantageously, the assembly and removal of a tensioning device having such features can be carried out quickly and simply even when the pedestal is completely assembled.

Further features and advantages of the present invention shall become clearer from the following detailed description of a preferred embodiment thereof, made hereafter, for indicating and not limiting purposes, with reference to the attached drawings. In such drawings.

Figure 1:
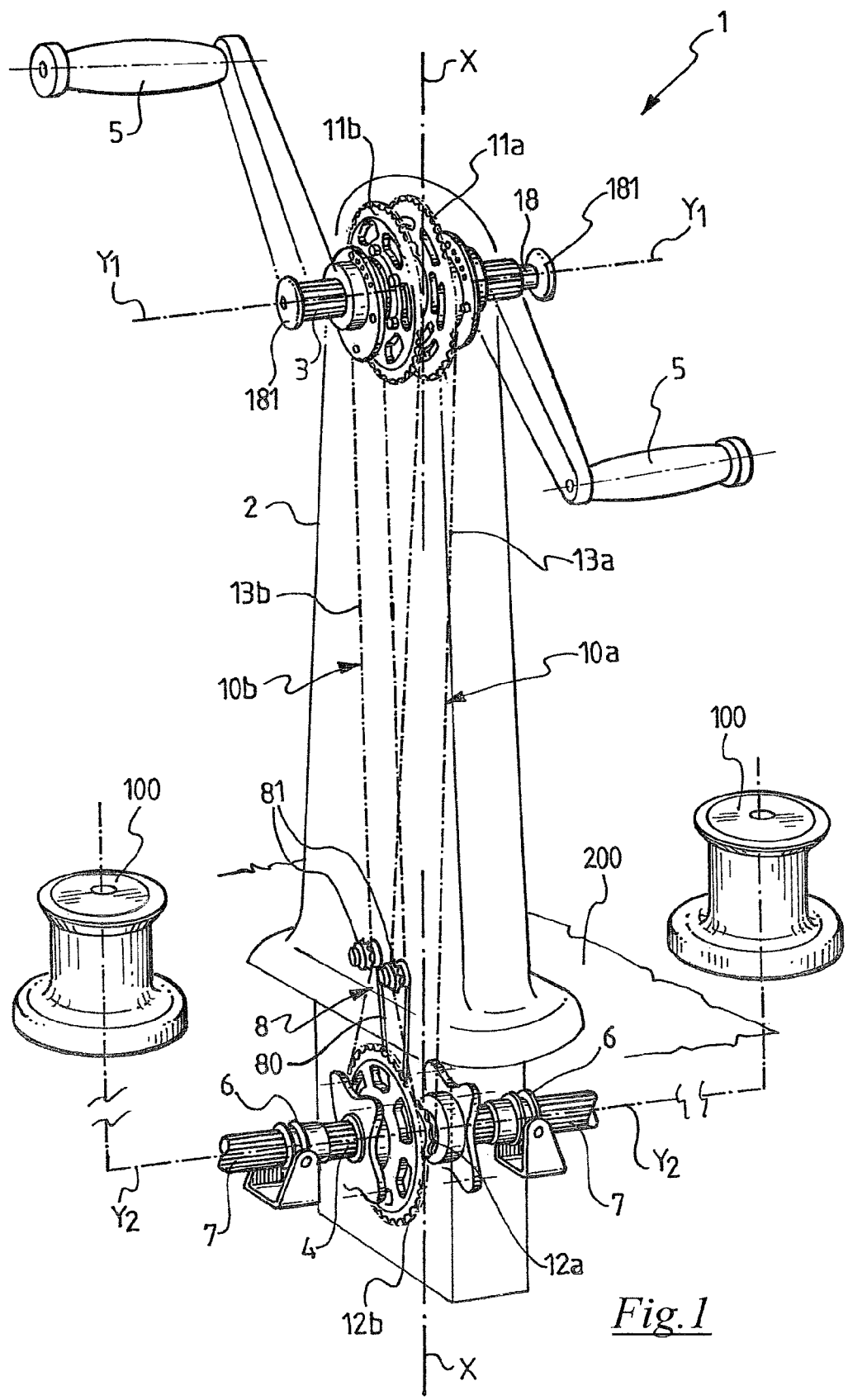
FIG. 1 is a schematic perspective view of a pedestal according to the invention.

In FIG. 1 a pedestal for a sailing boat (not shown in detail, since it is not part of the invention), according to the invention, is wholly indicated with reference numeral 1.

The pedestal 1 comprises a casing 2 of a substantially elongated shape, typically made from a composite material such as glass fibre or carbon fibre.

With reference to the arrangement of the pedestal 1 mounted on the boat, at a top end portion thereof a motion input shaft 3 is arranged, and at a bottom end portion thereof a motion output shaft 4 is arranged. The latter, when the pedestal 1 is mounted on the boat, is located under the deck 200. The motion input shaft 3 and the motion output shaft 4 have respective longitudinal axes Y1-Y1 and Y2-Y2 substantially parallel to each other and perpendicular to the longitudinal axis X-X of the pedestal 1.

At end portions of the motion input shaft 3 projecting outside the casing 2 handles 5 are mounted, through which the members of the crew can actuate in rotation the shaft 3.

At end portions of the motion output shaft 4 projecting outside the casing 2 clutches 6 are arranged that are actuatable to selectively connect in rotation the shaft 4 with motion transmission shafts 7 forming part of motion transmission branches (only schematically indicated) from the pedestal 1 to respective winches 100 driven by it. It should be noted that in the embodiment described here reference is made, as an example, to a pedestal 1 that drives two winches 100, but, for the purposes of the invention, the number of winches 100 is irrelevant and could be lower or higher.

In the preferred embodiment described here, the pedestal 1 comprises, inside the casing 2, two motion transmission groups 10a, 10b which carry out the motion transmission from the motion input shaft 3 to the motion output shaft 4.

The first motion transmission group 10a comprises a first driving wheel 11a associated with the motion input shaft 3 and a first driven wheel 12a associated with the motion output shaft 4 operatively connected with each other through a first motion transmission element 13a. Similarly, the second motion transmission group 10b comprises a second driving wheel 11b associated with the motion input shaft 3 and a second driven wheel 12a associated with the motion output shaft 4 operatively connected with each other through a second motion transmission element 13b.

In the preferred embodiment illustrated here the driving wheels 11a, 11b and the driven wheels 12a, 12b are toothed wheels and the transmission elements 13a, 13b are chains (only schematically illustrated). Nevertheless, embodiments are equally possible in which, instead of toothed wheels and chains, pulleys and belts are respectively used.

The driving wheels 11a, 11b have the same diameter, whereas the driven wheels 12a, 12b have different diameters and the larger driven wheel (in the illustrated example the driven wheel 12b, see FIG. 1) has a diameter equal to that of the driving wheels 11a, 11b. In this way, one of the two motion transmission groups 10a, 10b (in the illustrated example the motion transmission group 10b, see FIG. 1) provides a pedestal gear ratio equal to 1, whereas the other provides a pedestal gear ratio greater than 1 and typically between 2 and 3.

Of course, a man skilled in the art shall immediately recognise that other combinations of diameters of the driving wheels 11a, 11b and driven wheels 12a, 12b are also possible, still suitable for providing the aforementioned gear ratios in the two motion transmission groups 10a, 10b. For example, in an alternative embodiment not illustrated, the driven wheels 12a, 12b can have the same diameter and the driving wheels 11a, 11b can have different diameters, with the diameter of the smaller driving wheel equal to the diameter of the driven wheels 12a, 12b.

Inside the casing 2 there are also actuating means 14 actuatable to selectively activate the motion transmission in the motion transmission group 10a or in the motion transmission group 10b. In this way, a speed variation system is provided inside the pedestal 1 that allows the rotation speed of the motion output shaft 4 to be selectively varied with respect to that of the motion input shaft 3, according to the invention.

Figure 2:
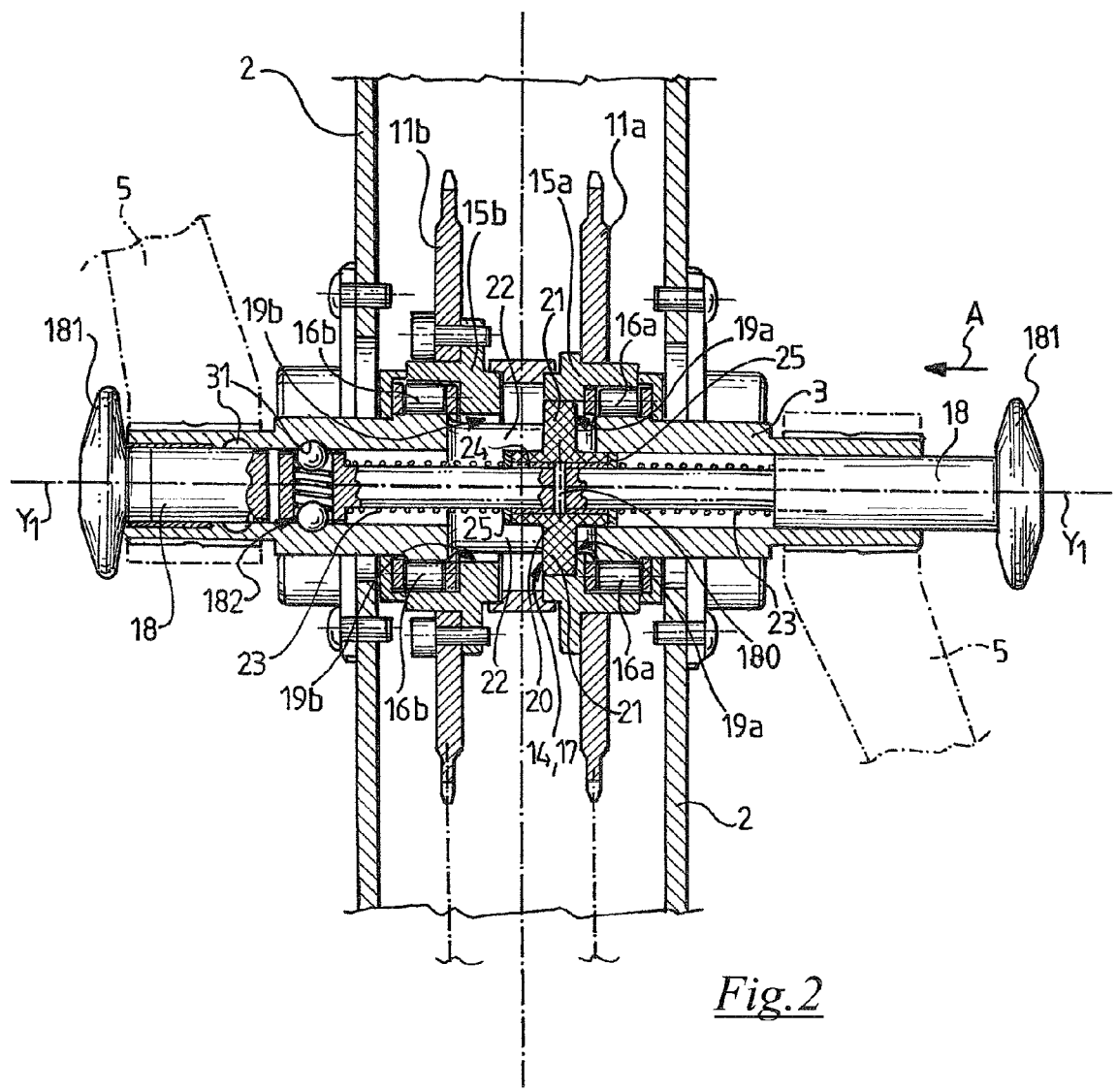
FIG. 2 is a schematic longitudinal section view of the pedestal of FIG. 1 at the motion input shaft, with the actuating means of the speed variation system in a first operating configuration.

FIG. 2 shows the structure of the actuating means 14 in the preferred embodiment of the pedestal 1 described here. The driving wheels 11a, 11b are mounted on the motion input shaft 3 free to rotate and the actuating means 14 consist of a claw clutch 17 actuatable to make one or the other of said driving wheels 11a, 11b selectively rotatably integral with the motion input shaft 3.

The actuation of the claw clutch 17 is preferably completely mechanical and is carried out by means of a drive shaft 18 mounted axially slidable inside the motion input shaft 3, which for this purpose is suitably made hollow. The drive shaft 18 can translate inside the motion input shaft 3 between a first operating position corresponding to a first operating configuration of the claw clutch 17, in which one of the driving wheels 11a, 11b is rotatably integral with the motion input shaft 3, and a second operating position corresponding to a second operating configuration of the claw clutch 17, in which the other of the driving wheels 11a, 11b is rotatably integral with the motion input shaft 3.

Figure 5:
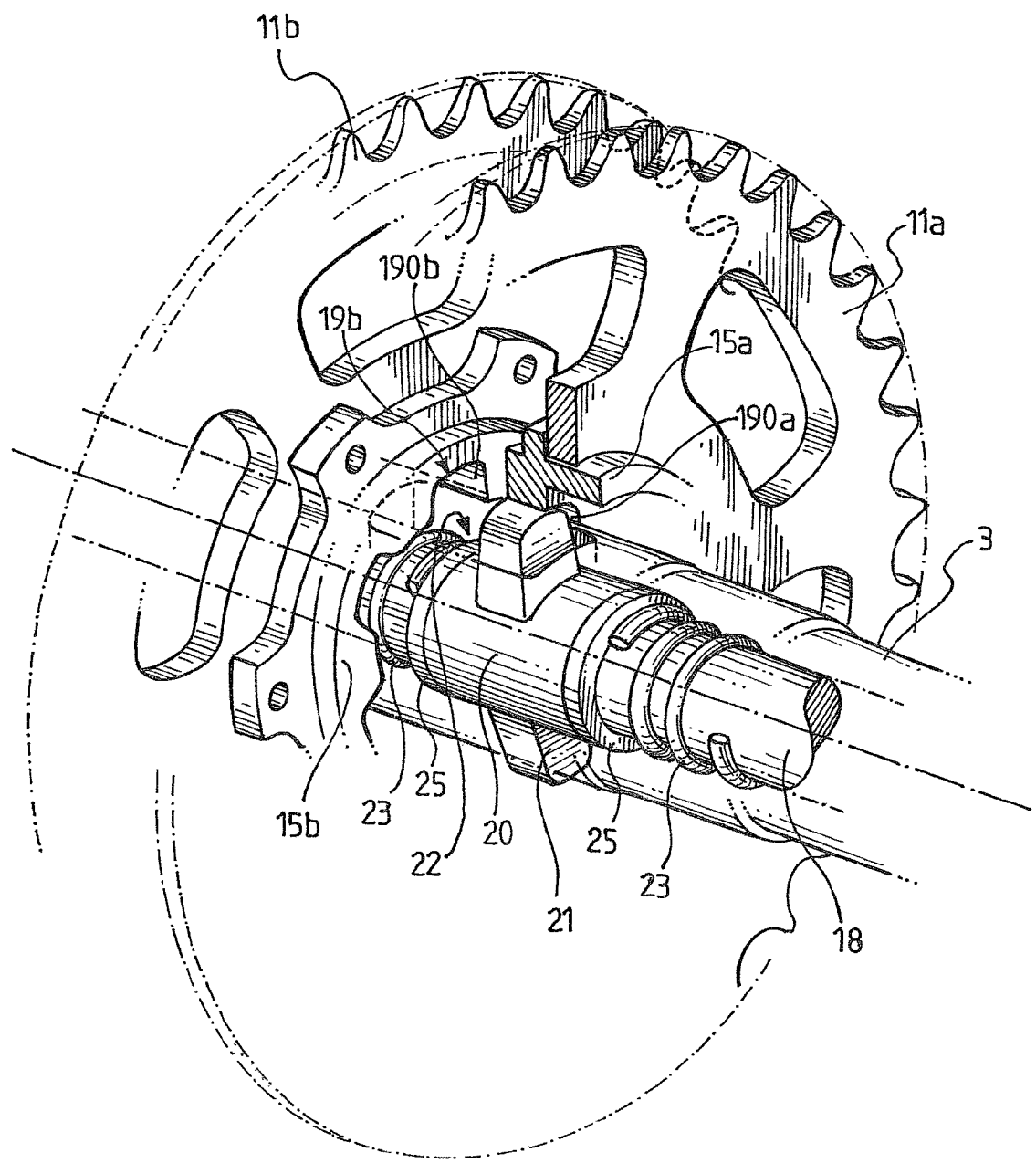
FIG. 5 is a schematic perspective view partially in section of a detail of the pedestal of FIG. 1 at the motion input shaft.

Again in FIG. 2, the components of the claw clutch 17 are shown in detail. In particular, the first and the second driving wheel 11a, 11b are associated with respective flanges 15a, 15b, in turn mounted free to rotate on the motion input shaft 3 through bearings 16a, 16b. The flanges 15a, 15b are provided with respective toothings 19a, 19b facing towards the motion input shaft 3. The toothings 19a, 19b define respective pluralities of clutch seats 190a, 190b of the claw clutch 17 (see FIG. 5).

An annular element 20 associated with the drive shaft 18 is provided with one or more teeth 21 extending radially from it and suitable for selectively engaging with the toothing 19a or the toothing 19b upon translation of the drive shaft 18. This is possible thanks to the provision, at the lateral surface of the motion input shaft 3, of one or more longitudinal openings 22 of predetermined length, through which the teeth 21 can project radially for a portion suitable for ensuring a proper engagement with the clutch seats 190a or 190b, as can be seen in particular in FIG. 5. In the preferred embodiment illustrated here the annular element 20 is provided with two teeth 21 angularly spaced apart by about 180°.

The annular element 20 is preferably slidably mounted on the drive shaft 18 and is axially maintained in position on it by means of two elastic elements 23 acting between axially opposite abutment portions defined in the drive shaft 18 and corresponding opposite sides of the annular element 20. As elastic elements 23 it is for example possible to use compression springs mounted coaxially with the drive shaft 18.

Preferably, between the annular element 20 and the drive shaft 18 a bushing 24 is arranged that is removably fixed to the drive shaft 18, for example through a pin (not shown) insertable in a respective seat 180 formed in the drive shaft 18. The bushing 24 has a length equal to that of the annular element 20 and a thickness suitable for defining axial abutments for two washers 25 mounted freely at opposite sides of the bushing 24 and of the annular element 20. In this embodiment, therefore, the elastic elements 23 do not act directly on the annular element 20, but rather on the washers 25. This construction makes the correct axial positioning in rest conditions of the annular element 20 movable on the drive shaft 18 easier and, as better explained hereafter, makes it simpler to actuate the claw clutch 17 when the mutual angular position between the motion input shaft 3 and the toothings 19a, 19b does not allow immediate engagement.

The drive shaft 18 preferably has a length greater than that of the motion input shaft 3, so that in any operating configuration a longitudinal end portion thereof projects axially with respect to the motion input shaft 3 and can be easily actuated, i.e. thrust, with one hand by a member of the crew which is operating the pedestal 1. Moreover, the longitudinal ends of the control shaft 18 are preferably provided with suitably shaped knobs 181.

The drive shaft 18 is preferably provided with releasable engagement means 182 to hold it stably in the aforementioned first and second operating position in the absence of an external actuation. In the embodiment illustrated here such engagement means 182 comprise a pair of small balls housed in a through hole formed in the drive shaft 18 and radially biased outwards through a compression spring arranged between them. At the inner surface of the hollow motion input shaft 3 and in positions appropriately axially spaced apart two perimetric grooves 31 are formed defining seats with which the engagement means 182 can engage when the drive shaft 18 is respectively in the aforementioned first and second operating position.

In the case in which the motion transmission elements 13a, 13b are chains, like in the embodiment described here, the pedestal 1 preferably comprises means for tensioning them. Since, as known, it is not possible to simultaneously obtain an optimal tensioning of two chains operating with the same center distance, the tensioning of a chain is achieved through adjustment of the distance between the longitudinal axes Y1-Y1 and Y2-Y2 of the motion input and output shafts 3, 4 while mounting them in the pedestal 1, whereas the tensioning of the other chain is achieved through a suitable tensioning device 8. As can be seen in FIG. 1, the tensioning device 8 preferably comprises a substantially V-shaped spring element 80 made from harmonic steel or another material having similar elastic properties. The spring element 80 has two free end portions acting on opposite branches of the chain, preferably through the interposition of rollers or other rolling elements, possibly toothed, and is preferably snap fitted to the motion output shaft 4.

Figure 3:
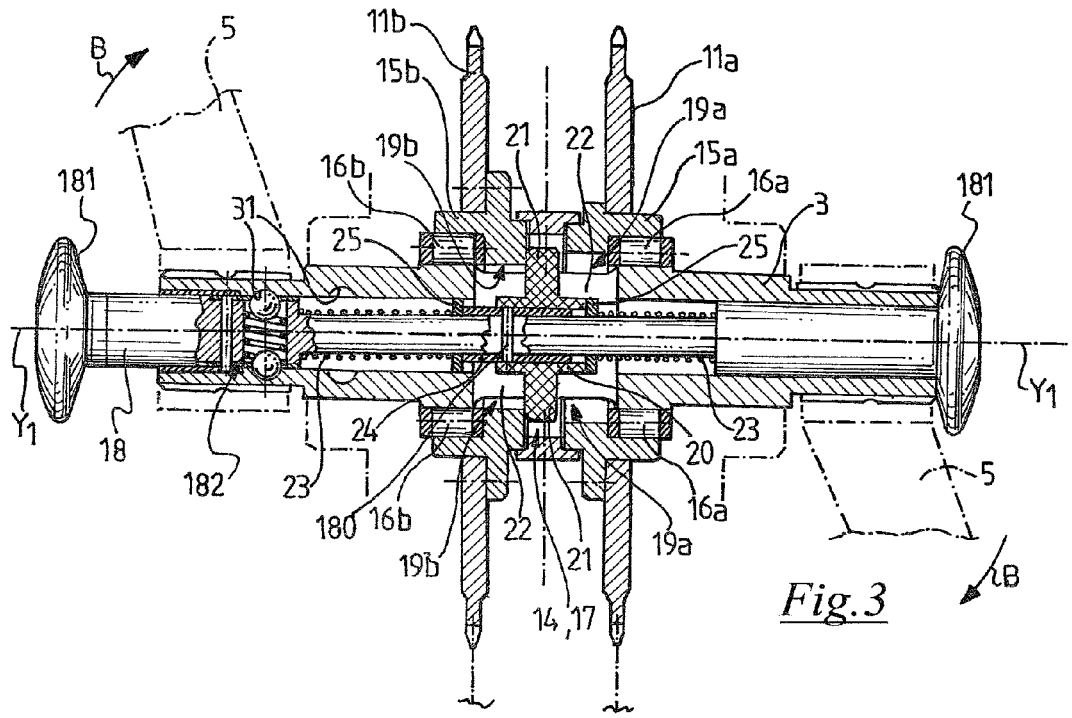
FIG. 3 is a schematic view similar to that of FIG. 2, with the actuating means of the speed variation system in an operating configuration intermediate between the first operating configuration shown in FIG. 2 and a second operating configuration shown in FIG. 4.
Figure 4:
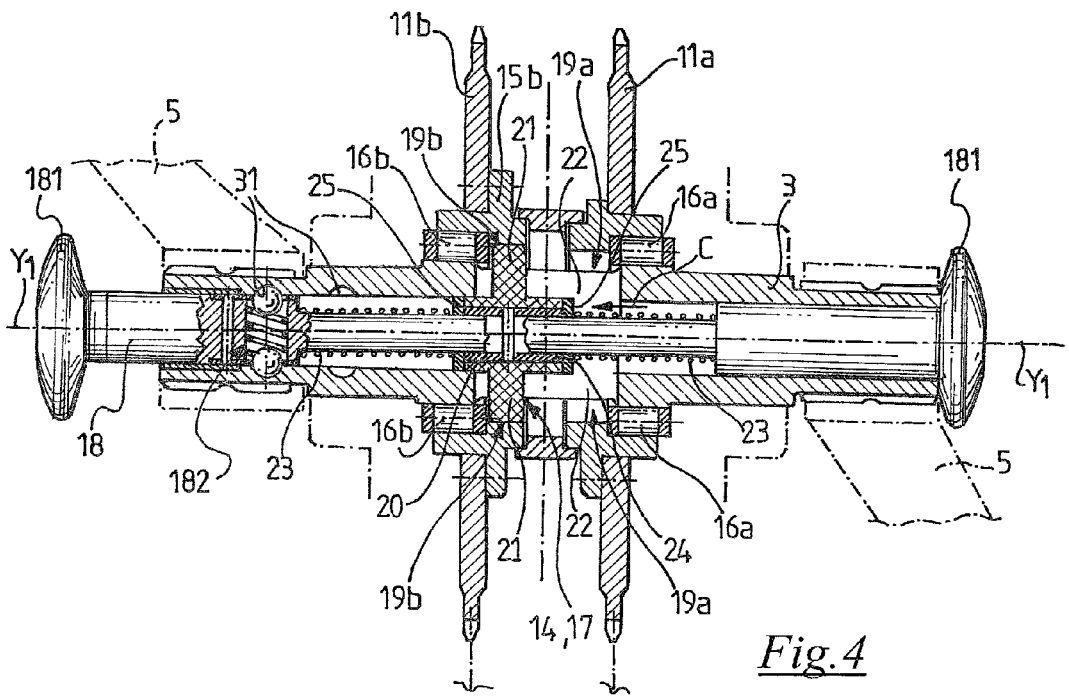
FIG. 4 is a schematic view similar to that of FIG. 2, with the actuating means of the speed variation system in a second operating configuration.

With reference to FIGS. 2-4 it shall now be described how the motion transmission is selectively activated in the motion transmission groups 10a and 10b of the pedestal 1.

FIG. 2 illustrates a first operating configuration of the actuating means 14, in which the position of the drive shaft 18 is such as to make active the transmission in the transmission group 10a. In particular, the driving wheel 11a is rotatably integral with the motion input shaft 3 thanks to the coupling between motion input shaft 3 and teeth 21 at the openings 22, and between teeth 21 and toothing 19a on the flange 15a associated with the driving wheel 11a. The engagement means 182 of the drive shaft 18 are engaged with a first of the grooves 31 and ensure that, in the absence of external actions, this operating configuration is stably maintained.

Since the transmission group 10a provides a gear ratio greater than 1 between motion input shaft 3 and motion output shaft 4 (see FIG. 1), with the actuating means 14 in the first operating configuration described above it is possible to obtain a rotation of the winches 100 at a speed higher than that of the motion input shaft 3, obtaining a so-called "overdrive" operating condition.

When, from this operating condition it is necessary to shift to a normal operating condition, in which the rotation speed of the winches 100 is equal to the actuation speed at the motion input shaft 3, the actuating means 14 are moved into a second operating configuration, corresponding to the activation of the motion transmission in the motion transmission group 10b.

To do this, a member of the crew acts on the drive shaft 18 thrusting it with one hand in the direction of arrow A in FIG. 2, possibly even without interrupting an action on the handles 5 with the other hand. The translation of the drive shaft 18 and of the annular element 20 together with it determines firstly the disengagement of the teeth 21 from the toothing 19a, thus making the driving wheel 11a again idle with respect to the motion input shaft 3 and deactivating the motion transmission group 10a.

Since the coupling between annular element 20 and drive shaft 18 is not fixed, the first translates integrally with the second only until the teeth 21 meet obstacles. Therefore, if upon actuation of the drive shaft 18 the angular position of the motion input shaft 3 is such that the teeth 21 exactly face respective seats 190b in the toothing 19b of the flange 15b associated with the driving wheel 11b, the drive shaft 18 and the annular element 20 translate together during the whole stroke of the drive shaft 18, until an operating position is reached in which the teeth 21 engage with the toothing 19b and the engagement means 182 of the drive shaft 18 are engaged with a second groove 31.

If, on the other hand, upon actuation of the drive shaft 18 the position of the teeth 21 is angularly staggered with respect to the seats 190*b* in the toothing 19*b*, the drive shaft 18 still freely translates up to the end of its stroke, again reaching the second operating position, whereas the teeth 21 stop against a face of the flange 15*b*, as shown in FIG. 3. This automatically determines a compression of the elastic element 23 on the thrusting side of the drive shaft 18.

In order to obtain the engagement in this condition it is sufficient to rotate the motion input shaft 3 (see arrows B in FIG. 3) so that the teeth 21 exactly face seats 190*b*. At this point, the elastic force of the previously compressed elastic element 23 shall by itself thrust (see arrow C in FIG. 4) the annular element 20, taking it into an operating position in which the teeth 21 engage with the toothing 19*b*, without any further action from the outside being required.

In any case, when the engagement has occurred and the actuating means 14 are in their second operating configuration shown in FIG. 4, the driving wheel 19*b* rotates integrally with the motion input shaft 3, in an similar way to what has been described above with respect to the driving wheel 19*a*, and the motion transmission is active in the transmission group 10*b*.

What has been outlined above can be repeated reversely in the case of an actuation of the drive shaft 18 in the opposite direction to that of arrow A of FIG. 2, to shift from an operating configuration in which the motion transmission group 10*b* is active to an operating configuration in which the motion transmission group 10*a* is active.

A man skilled in the art shall recognise that, without affecting the operating principles described above, according to the needs, different kinds of clutch, e.g. friction clutches or electromagnetic clutches, and/or of actuation thereof, e.g. electromechanical, hydraulic or pneumatic, can be used.

Moreover, it is possible to foresee embodiments (not shown) wherein the driven wheels 12*a*, 12*b* are mounted free to rotate on the motion output shaft 4 and the actuating means 14 are associated with such a shaft, whereas the driving wheels 11*a*, 11*b* on the motion input shaft 3 are fixed.

In alternative embodiments of the invention, not described in detail, it is foreseen to use two driving wheels with different diameters and one driven wheel, or else two driven wheels with different diameters and one driving wheel, and just one motion transmission element. In this case, to achieve a variation of rotation speed of the motion output shaft 4 with respect to that of the motion input shaft 3 the single transmission element is taken into engagement selectively with one or the other of said two driving wheels, or else of said two driven wheels, through appropriate actuating means, for example in the form of a derailleur.

In further alternative embodiments it is foreseen to use one single driving wheel and one single driven wheel and a gearbox to achieve the aforementioned variation of rotation speed, which is housed inside the casing 2 and is kinematically connected to the driving wheel and to the driven wheel through respective transmission elements.

The invention claimed is:

1. Pedestal for a sailing boat, comprising a casing and, inside said casing:
   at least one driving wheel associated with a motion input shaft;
   at least one driven wheel associated with a motion output shaft, and
   at least one motion transmission element from said at least one driving wheel to said at least one driven wheel,
   and further comprising, inside said casing, a speed variation system selectively activatable to vary the rotation speed of said motion output shaft with respect to that of said motion input shaft, characterized in that the speed variation system comprises:
   a first driving wheel associated with said motion input shaft and a first driven wheel associated with said motion output shaft operatively connected with each other through a first motion transmission element to form a first motion transmission group; and
   a second driving wheel associated with said motion input shaft and a second driven wheel associated with said motion output shaft operatively connected with each other through a second motion transmission element to form a second motion transmission group; and
   wherein at least one from said first and second driving wheels and said first and second driven wheels has a diameter different from the other wheels, and
   wherein said speed variation system comprises actuating means actuatable to selectively activate one of said first and second motion transmission groups.

2. Pedestal according to claim 1, wherein said speed variation system comprises a gearbox operatively interposed between a first motion transmission element acting between said at least one driving wheel and said gearbox and a second motion transmission element acting between said gearbox and said at least one driven wheel.

3. Pedestal according to claim 1, comprising at least two driving wheels having different diameters associated with the motion input shaft and one driven wheel associated with the motion output shaft, wherein said speed variation system comprises actuating means activatable to allow the engagement of said at least one motion transmission element selectively with a wheel of said at least two driving wheels.

4. Pedestal according to claim 3, wherein said driven wheel has a diameter equal to the smaller of the diameters of said at least two driving wheels.

5. Pedestal according to claim 1, comprising a driving wheel associated with the motion input shaft and at least two driven wheels having different diameters associated with the motion output shaft, wherein said speed variation system comprises actuating means activatable to allow the engagement of said at least one motion transmission element selectively with a wheel of said at least two driven wheels.

6. Pedestal according to claim 5, wherein said driving wheel has a diameter equal to the greater of the diameters of said at least two driven wheels.

7. Pedestal according to claim 3, wherein said actuating means comprise a derailleur.

8. Pedestal according to claim 1, wherein said first and second driving wheel have a same diameter and said first and second driven wheel have different diameters, and wherein the diameter of the larger driven wheel is equal to the diameter of said first and second driving wheel.

9. Pedestal according to claim 1, wherein said first and second driving wheel have different diameters and said first and second driven wheel have a same diameter, and wherein the diameter of the smaller driving wheel is equal to the diameter of said first and second driven wheel.

10. Pedestal according to claim 1, wherein said actuating means in a first operating configuration are associated with said first driving wheel and in a second operating configuration are associated with said second driving wheel.

11. Pedestal according to claim 1, wherein said actuating means in a first operating configuration are associated with said first driven wheel and in a second operating configuration are associated with said second driven wheel.

12. Pedestal according to claim 1, wherein said first and second driving wheel or said first and second driven wheel are respectively mounted on said motion input shaft or on said motion output shaft free to rotate and said actuating means comprise at least one clutch and drive means of said at least one clutch actuatable to make one from said first and second driving wheel or from said first and second driven wheel selectively rotatably integral with the respective shaft.

13. Pedestal according to claim 12, wherein said at least one clutch comprises a first and a second flange respectively associated with said first and second driving wheel or with said first and second driven wheel, said first and second flange being provided with respective toothings facing towards said motion input shaft or said motion output shaft, and an annular element associated with said motion input shaft or with said motion output shaft, said at least one annular element being provided with at least one tooth extending radially and suitable for selectively engaging with the toothing of said first flange or of said second flange upon actuation of said drive means.

14. Pedestal according to claim 13, wherein said motion input shaft or said motion output shaft is hollow and is provided, at a lateral surface thereof, with at least one longitudinal opening of predetermined length, wherein said drive means comprise a drive shaft slidably mounted in said motion input shaft or said motion output shaft, and wherein said annular element is associated with said drive shaft so that said at least one tooth projects radially through said at least one opening and, upon actuation of said drive shaft, translates along said at least one opening between a first operating position, in which said at least one tooth is engaged with the toothing of said first flange, and a second operating position, in which said at least one tooth is engaged with the toothing of said second flange.

15. Pedestal according to claim 14, wherein said annular element is slidably mounted on said drive shaft and said drive means comprise at least two elastic elements respectively acting between axially opposite abutment portions defined in said drive shaft and corresponding opposite sides of said annular element.

16. Pedestal according to claim 1, wherein said at least one motion transmission element is a belt and said at least one driving wheel and at least one driven wheel are pulleys.

17. Pedestal according to claim 1, wherein said at least one motion transmission element is a chain and said at least one driving wheel and at least one driven wheel are toothed wheels.

18. Pedestal according to claim 17, comprising a tensioning device for said chain.

19. Pedestal according to claim 18, wherein said tensioning device comprises a substantially V-shaped spring element having two free end portions acting on opposite branches of said chain.

20. Pedestal according to claim 19, wherein said spring element is snap fitted to said motion output shaft.

\* \* \* \* \*